(12) United States Patent
Atsushi et al.

(10) Patent No.: US 12,371,123 B2
(45) Date of Patent: Jul. 29, 2025

(54) BRAKE HYDRAULIC PRESSURE CONTROL SYSTEM AND STRADDLE-TYPE VEHICLE

(71) Applicant: Robert Bosch GmbH, Stuttgart (DE)

(72) Inventors: Hiroaki Atsushi, Kanagawa (JP);
Mikiya Kotaka, Kanagawa (JP);
Kosaku Sagayama, Kanagawa (JP)

(73) Assignee: Robert Bosch GmbH, Stuttgart (DE)

( * ) Notice: Subject to any disclaimer, the term of this patent is extended or adjusted under 35 U.S.C. 154(b) by 442 days.

(21) Appl. No.: 17/798,198

(22) PCT Filed: Feb. 15, 2021

(86) PCT No.: PCT/IB2021/051231
§ 371 (c)(1),
(2) Date: Aug. 8, 2022

(87) PCT Pub. No.: WO2021/171131
PCT Pub. Date: Sep. 2, 2021

(65) Prior Publication Data
US 2023/0092378 A1    Mar. 23, 2023

(30) Foreign Application Priority Data
Feb. 27, 2020    (JP) ................................. 2020-031443

(51) Int. Cl.
*B62L 3/02*    (2006.01)
*B60T 13/14*    (2006.01)
(Continued)

(52) U.S. Cl.
CPC ............ *B62L 3/023* (2013.01); *B60T 13/745* (2013.01); *H02K 5/1732* (2013.01); *H02K 7/083* (2013.01);
(Continued)

(58) Field of Classification Search
CPC ...... B62L 3/023; B60T 13/745; B60T 13/686; B60T 8/3225; B60T 8/368; B60T 8/4022;
(Continued)

(56) References Cited

U.S. PATENT DOCUMENTS

2002/0153768 A1    10/2002    Mohr et al.
2009/0189440 A1    7/2009    Abe et al.
(Continued)

FOREIGN PATENT DOCUMENTS

DE    102007001733 A1    7/2008
JP    2014015077 A    1/2014

OTHER PUBLICATIONS

WO document No. WO 2018002735 to Atsushi et al published on Jan. 4, 2018.*
(Continued)

*Primary Examiner* — Pamela Rodriguez
(74) *Attorney, Agent, or Firm* — Michael Best & Friedrich LLP (57) ABSTRACT

To achieve a brake hydraulic pressure control system for a straddle-type vehicle which makes it possible to reduce its size as compared to existing ones.
A brake hydraulic pressure control system (70) according to the present invention including: a substrate (80); a motor (40) which is a brushless motor configured to drive a pump device (31); a housing (85) which is connected to the substrate (80); and a detection mechanism (60) which is configured to detect the rotation state of an output shaft (45) of the motor (40), in which the motor (40) is disposed in a space surrounded by the substrate (80) and the housing (85), and a bearing (46) of the motor (40) is inserted into a concave part (84) formed in the substrate (80).

12 Claims, 5 Drawing Sheets

(51) Int. Cl.
    *B60T 13/68*     (2006.01)
    *B60T 13/74*     (2006.01)
    *H02K 5/173*     (2006.01)
    *H02K 7/08*     (2006.01)
    *H02K 11/21*     (2016.01)

(52) U.S. Cl.
    CPC ............ *H02K 11/21* (2016.01); *B60T 13/142* (2013.01); *B60T 13/686* (2013.01); *H02K 2211/03* (2013.01)

(58) Field of Classification Search
    CPC . B60T 13/142; F16D 2121/24; H02K 5/1732; H02K 7/083; H02K 11/21; H02K 17/02; H02K 5/08
    See application file for complete search history.

(56) References Cited

U.S. PATENT DOCUMENTS

2020/0063881 A1*   2/2020   Sagayama ............. F16K 27/048
2021/0114573 A1*   4/2021   Sagayama ............. F15B 13/026

OTHER PUBLICATIONS

WO document No. WO 2020058787 to Koike et al published on Mar. 26, 2020.*
WO document No. WO 2021171122 to Koike et al published on Sep. 2, 2021.*
Translation of German Patent No. DE 102007001733 obtained from website: https://worldwide.espacenet.com on Dec. 17, 2024.*
International Search Report and Written Opinion for Application No. PCT/IB2021/051231 dated May 18, 2021 (10 pages).

* cited by examiner

BRAKE HYDRAULIC PRESSURE CONTROL SYSTEM AND STRADDLE-TYPE VEHICLE

BACKGROUND

The present invention relates to a brake hydraulic pressure control system for a straddle-type vehicle, and to a straddle-type vehicle equipped with the brake hydraulic pressure control system.

Some of existing vehicles are equipped with a brake hydraulic pressure control system for causing a brake system to execute an anti-lock braking operation. In a state where a passenger of a vehicle is manipulating an input part such as a brake lever, this brake hydraulic pressure control system amplifies or reduces the pressure of brake fluid inside a brake fluid circuit to adjust a braking force to be generated on wheels. Some of such brake hydraulic pressure control systems are formed by unitizing components such as: a flow channel which constitutes a part of the brake fluid circuit; a motor which is a driving source for a pump device configured to amplify the pressure of brake fluid inside the brake fluid circuit; and a control board for the motor (see JP-A-2014-15077, for example).

Specifically, the unitized brake hydraulic pressure control system includes: a substrate in which a flow channel for brake fluid is formed; a motor which is a driving source for a pump device provided in the flow channel for brake fluid; a control board for the motor; and a housing which houses therein the control board. The substrate of the brake hydraulic pressure control system substantially has the shape of a rectangular solid, and the housing is attached to one surface thereof. Here, let us assume that the surface of the substrate to which the housing is attached is a first surface, and a surface of the substrate opposed to the first surface is a second surface. When the first surface and the second surface are defined in this manner, in the existing brake hydraulic pressure control systems, the motor which is a driving source for the pump device is attached to the second surface of the substrate. In other words, in the unitized brake hydraulic pressure control system, the motor which is a driving source for the pump device is provided outside the substrate and the housing.

A straddle-type vehicle being one type of a vehicle has low flexibility in the layout of components and low flexibility in the installation of a brake hydraulic pressure control system as compared to vehicles such as an automatic four-wheeled vehicle. For this reason, there is a problem of the growing demand for reduction in size of a brake hydraulic pressure control system to be installed in a straddle-type vehicle.

SUMMARY

The present invention has been made in view of the above problem. A first objective of the present invention is to achieve a brake hydraulic pressure control system for a straddle-type vehicle which makes it possible to reduce its size as compared to existing ones. In addition, a second objective of the present invention is to achieve a straddle-type vehicle equipped with such a brake hydraulic pressure control system.

A brake hydraulic pressure control system according to the present invention includes: a substrate in which a flow channel for brake fluid is formed; a motor which includes a stator, a rotor, and an output shaft secured to the rotor, and is a driving source for a pump device provided in the flow channel; a control board for the motor; and a housing which houses therein the control board, and is connected to the substrate. In the brake hydraulic pressure control system, the motor is a brushless motor, and is disposed in a space surrounded by the substrate and the housing, the output shaft is secured to the rotor in such a way that both a first end part and a second end part of the output shaft protrude from the rotor, the motor includes a first bearing which is configured to rotatably support the output shaft at a position between the first end part and the rotor, a second bearing which is configured to rotatably support the output shaft at a position between the second end part and the rotor, and a motor housing which houses therein the stator and the rotor, and holds the first bearing and the second bearing, the brake hydraulic pressure control system further includes a detection mechanism which is configured to detect a rotation state of the output shaft, a first concave part which opens toward the housing is formed in the substrate, and the first bearing of the motor is inserted into the first concave part.

In addition, a straddle-type vehicle according to the present invention is equipped with the brake hydraulic pressure control system according to the present invention.

In the brake hydraulic pressure control system according to the present invention, the motor is disposed in the space surrounded by the substrate and the housing. Accordingly, the brake hydraulic pressure control system according to the present invention makes it possible to reduce its size as compared to existing brake hydraulic pressure control systems.

In the meantime, the motor of the brake hydraulic pressure control system according to the present invention is a brushless motor. Thus, the brake hydraulic pressure control system according to the present invention requires the detection mechanism which is configured to detect the rotation state of the output shaft of the motor. In order for the detection mechanism to accurately detect the rotation state of the output shaft, what is important is the positional accuracy at the time of installing the motor in the space surrounded by the substrate and the housing. Here, the installation space for the motor is limited in the space surrounded by the substrate and the housing. Hence, the brake hydraulic pressure control system according to the present invention positions the motor by inserting the first bearing of the motor into the first concave part of the substrate. The first bearing which is configured to rotatably support the output shaft is originally included in the motor. In other words, the brake hydraulic pressure control system according to the present invention positions the motor using the first bearing originally included in the motor. Accordingly, in the brake hydraulic pressure control system according to the present invention, it is possible to improve the positional accuracy of the motor even in the case of installing the brushless motor in the space surrounded by the substrate and the housing.

DETAILED DESCRIPTION

Hereinbelow, a brake hydraulic pressure control system and a straddle-type vehicle according to the present invention are described using the drawings.

Note that, although the following description is provided as to a case in which the present invention is employed in two-wheeled motor vehicles, the present invention may be employed in straddle-type vehicles other than the two-wheeled motor vehicles. Examples of the straddle-type vehicles other than the two-wheeled motor vehicles include three-wheeled motor vehicles and buggies using at least one of an engine and an electric motor as its driving source. Other examples of the straddle-type vehicles other than the two-wheeled motor vehicles include bicycles. The bicycles denote all kinds of vehicles capable of driving forward on a road by effort applied to pedals. In other words, the bicycles include normal bicycles, pedal-assisted electric bicycles, electric bicycles, and the like. Meanwhile, the two-wheeled motor vehicles or the three-wheeled motor vehicles denote so-called motorcycles, and the motorcycles include motorbikes, scooters, electric scooters, and the like. Meanwhile, although the following description is provided as to a case in which the brake hydraulic pressure control system includes dual hydraulic circuits, the number of hydraulic circuits in the brake hydraulic pressure control system is not limited to two. The brake hydraulic pressure control system may include only a single hydraulic circuit, or alternatively may include triple or larger-line hydraulic circuits.

In addition, the configuration, operation, and the like described below is one example, and the brake hydraulic pressure control system and the straddle-type vehicle according to the present invention are not limited to the case of having such a configuration, operation, and the like. Moreover, in the drawings, the same reference signs are given to the same or similar members or portions, or no reference signs are given to one or some of the same or similar members or portions. Further, their detailed structures are either illustrated in a simple manner or not described as needed. Furthermore, redundant description is either given in a simple manner or not given as needed.

Embodiment

Hereinbelow, a brake system for a straddle-type vehicle equipped with the brake hydraulic pressure control system according to this embodiment.

<Configuration and Operation of Brake System for Straddle-type Vehicle>

The configuration and operation of the brake system according to this embodiment is described.

Figure 1:
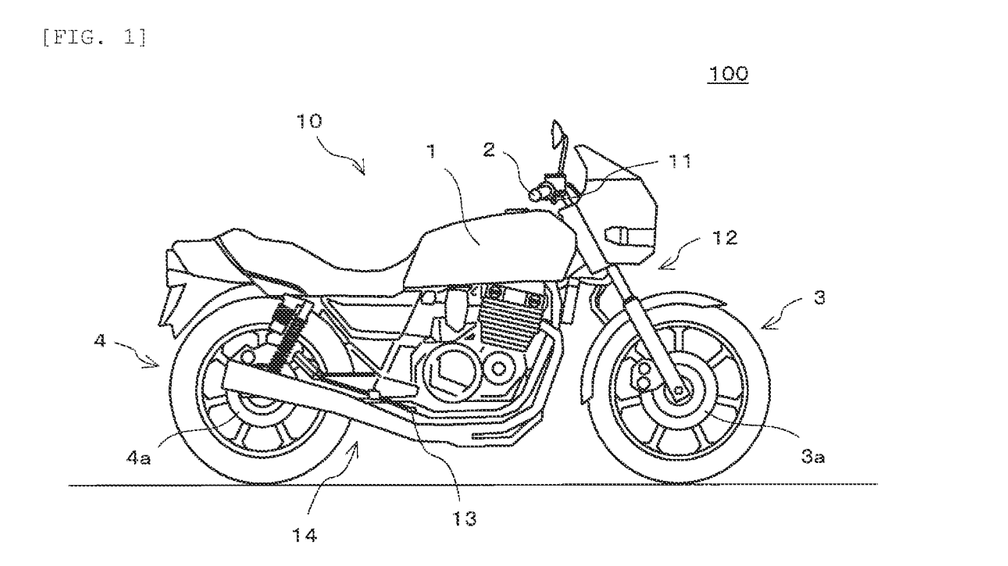
FIG. 1 is a view illustrating the configuration of a straddle-type vehicle equipped with a brake system according to an embodiment of the present invention.
Figure 2:
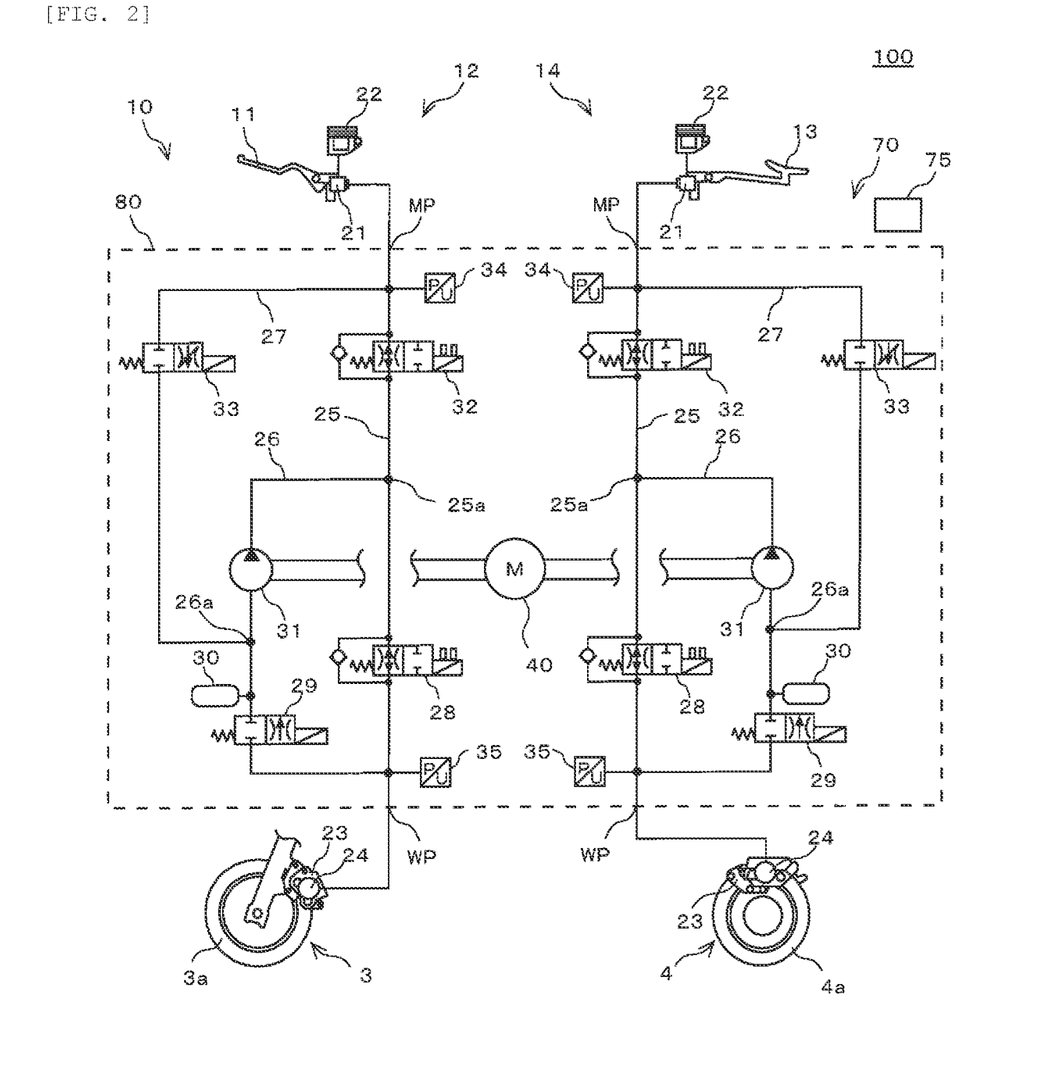
FIG. 2 is a view illustrating the configuration of the brake system according to the embodiment of the present invention.

FIG. 1 is a view illustrating the configuration of the straddle-type vehicle equipped with the brake system according to the embodiment of the present invention. FIG. 2 is a view illustrating the configuration of the brake system according to the embodiment of the present invention.

As illustrated in FIG. 1 and FIG. 2, a brake system 10 is mounted to a straddle-type vehicle 100 such as a two-wheeled motor vehicle. The straddle-type vehicle 100 includes: a trunk 1; a handlebar 2 which is turnably held by the trunk 1; a front wheel 3 which is turnably held by the trunk 1 together with the handlebar 2; and a rear wheel 4 which is pivotally held by the trunk 1.

The brake system 10 includes: a brake lever 11; a first hydraulic circuit 12 which is filled with brake fluid; a brake pedal 13; and a second hydraulic circuit 14 which is filled with brake fluid. In other words, the brake system 10 is equipped with two brake fluid circuits (the first hydraulic circuit 12 and the second hydraulic circuit 14). The brake lever 11 is provided to the handlebar 2 and manipulated by the hands of a user. The first hydraulic circuit 12 is configured to apply a brake force, corresponding to the amount of manipulation of the brake lever 11, to a rotor 3a that is configured to rotate together with the front wheel 3. The brake pedal 13 is provided below the trunk 1 and manipulated by the feet of the user. The second hydraulic circuit 14 is configured to apply a brake force, corresponding to the amount of manipulation of the brake pedal 13, to a rotor 4a that is configured to rotate together with the rear wheel 4.

Note that, the brake lever 11 and the brake pedal 13 are one example of a brake input part. For example, a brake pedal other than the brake pedal 13 provided to the trunk 1 may be employed as a brake input part instead of the brake lever 11. In addition, for example, a brake lever other than the brake lever 11 provided to the handlebar 2 may be employed as a brake input part instead of the brake pedal 13. Further, the first hydraulic circuit 12 may be configured to apply a brake force, corresponding to the amount of manipulation of the brake lever 11 or the amount of manipulation of the brake pedal other than the brake pedal 13 provided to the trunk 1, to the rotor 4a that is configured to rotate together with the rear wheel 4. Furthermore, the second hydraulic circuit 14 may be configured to apply a brake force, corresponding to the amount of manipulation of the brake pedal 13 or the amount of manipulation of the brake lever other than the brake lever 11 provided to the handlebar 2, to the rotor 3a that is configured to rotate together with the front wheel 3.

The first hydraulic circuit 12 and the second hydraulic circuit 14 have the same configuration. Thus, in the following description, the configuration of the first hydraulic circuit 12 is described on their behalf.

The first hydraulic circuit 12 includes: a master cylinder 21 which is embedded with a piston (not illustrated in the drawing); a reservoir 22 which is attached to the master cylinder 21; a brake caliper 23 which is held by the trunk 1 and has a brake pad (not illustrated in the drawing); and a wheel cylinder 24 which is configured to activate the brake pad (not illustrated in the drawing) of the brake caliper 23.

In the first hydraulic circuit 12, the master cylinder 21 and the wheel cylinder 24 communicate with each other via: a fluid duct which is connected between the master cylinder 21 and a master cylinder port MP formed in a substrate 80; a main flow channel 25 which is formed in the substrate 80; and a fluid duct which is connected between the wheel cylinder 24 and a wheel cylinder port WP formed in the substrate 80. In addition, a sub-flow channel 26 is formed in the substrate 80. Via this sub-flow channel 26, brake fluid inside the wheel cylinder 24 is released to a main flow channel midstream part 25a that is a midstream part of the main flow channel 25. Further, in this embodiment, a pressure amplifying flow channel 27 is formed in the substrate 80. Via this pressure amplifying flow channel 27, brake fluid inside the master cylinder 21 is fed to a sub-flow channel midstream part 26a that is a midstream part of the sub-flow channel 26.

An inlet valve 28 is provided to the main flow channel 25 in a region closer to the wheel cylinder 24 than the main flow channel midstream part 25a. The flow rate of brake fluid passing through this region is controlled by opening and closing operations of the inlet valve 28. To the sub-flow channel 26 in a region upstream of the sub-flow channel midstream part 26a, an outlet valve 29 and an accumulator 30 which is configured to store brake fluid are provided in this order from the upstream side. The flow rate of brake fluid passing through this region is controlled by opening and closing operations of the outlet valve 29. In addition, a pump device 31 is provided to the sub-flow channel 26 in a region downstream of the sub-flow channel midstream part 26a. A switching valve 32 is provided to the main flow channel 25 in a region closer to the master cylinder 21 than the main flow channel midstream part 25a. The flow rate of brake fluid passing through this region is controlled by opening and closing operations of the switching valve 32. A pressure amplifying valve 33 is provided to the pressure amplifying flow channel 27. The flow rate of brake fluid passing through the pressure amplifying flow channel 27 is controlled by opening and closing operations of the pressure amplifying valve 33.

Meanwhile, a master cylinder hydraulic pressure sensor 34 which is configured to detect the hydraulic pressure of brake fluid inside the master cylinder 21 is provided to the main flow channel 25 in a region closer to the master cylinder 21 than the switching valve 32. In addition, a wheel cylinder hydraulic pressure sensor 35 which is configured to detect the hydraulic pressure of brake fluid inside the wheel cylinder 24 is provided to the main flow channel 25 in a region closer to the wheel cylinder 24 than the inlet valve 28.

In other words, the main flow channel 25 causes the master cylinder port MP and the wheel cylinder port WP to communicate with each other via the inlet valve 28. In addition, the sub-flow channel 26 is a flow channel defined as a part or all of the flow channel which releases brake fluid inside the wheel cylinder 24 to the master cylinder 21 via the output valve 29. Further, the pressure amplifying flow channel 27 is a flow channel defined as a part or all of the flow channel which feeds brake fluid inside the master cylinder 21 to the sub-flow channel 26, at a position upstream of the pump device 31, via the pressure amplifying valve 33.

The inlet valve 28 is an electromagnetic valve which is configured to switch, when changed from de-energized to energized state for example, its mode from opening to closing of passage of brake fluid flowing through its installed position. The outlet valve 29 is an electromagnetic valve which is configured to switch, when changed from de-energized to energized state for example, its mode from closing to opening of passage of brake fluid flowing through its installed position toward the sub-flow channel midstream part 26a. The switching valve 32 is an electromagnetic valve which is configured to switch, when changed from de-energized to energized state for example, its mode from opening to closing of passage of brake fluid flowing through its installed position. The pressure amplifying valve 33 is an electromagnetic valve which is configured to switch, when changed from de-energized to energized state for example, its mode from closing to opening of passage of brake fluid flowing through its installed position toward the sub-flow channel midstream part 26a.

The pump device 31 of the first hydraulic circuit 12 and the pump device 31 of the second hydraulic circuit 14 are driven by a shared motor 40. In other words, the motor 40 is a driving source for these pump devices 31.

The substrate 80, the components provided to the substrate 80 (such as the inlet valve 28, the outlet valve 29, the accumulator 30, the pump device 31, the switching valve 32, the pressure amplifying valve 33, the master cylinder hydraulic pressure sensor 34, the wheel cylinder hydraulic pressure sensor 35, and the motor 40), and a control unit (ECU) 75 constitute a brake hydraulic pressure control system 70. Note that, in this embodiment, the components such as the inlet valve 28, the outlet valve 29, the accumulator 30, the pump device 31, the switching valve 32, the pressure amplifying valve 33, the master cylinder hydraulic pressure sensor 34, the wheel cylinder hydraulic pressure sensor 35, and the motor 40 are sometimes collectively referred to as a brake fluid hydraulic pressure control mechanism. In other words, the brake fluid hydraulic pressure control mechanism is a mechanism used for controlling the hydraulic pressure of brake fluid in the first hydraulic circuit 12 and the second hydraulic circuit 14.

The number of the control unit 75 may be one or more than one. In addition, the control unit 75 may be attached to the substrate 80, or alternatively may be attached to a member other than the substrate 80. In addition, for example, a part or all of the control unit 75 may be constituted of a component such as a microcomputer and a microprocessor unit, or alternatively may be constituted of an updatable component such as firmware, or alternatively may be a program module and the like executed by commands from a CPU and the like.

Note that, as is to be described later, in the brake hydraulic pressure control system 70 according to this embodiment, at least a part of the control unit 75 is constituted of a control board 76. In addition, in this embodiment, the control board 76 has a function to control start, stop, and the like of the motor 40. In other words, it is possible to say that the brake hydraulic pressure control system 70 according to this embodiment includes the control board 76 for the motor 40. Besides, in this embodiment, the control board 76 also performs control over the components constituting the brake fluid hydraulic pressure control mechanism. In other words, it is also possible to say that the brake hydraulic pressure control system 70 according to this embodiment includes the control board 76 for the brake fluid hydraulic pressure control mechanism.

For example, in a normal state, the inlet valve 28, the output valve 29, the switching valve 32, and the pressure amplifying valve 33 are controlled to be de-energized by the control unit 75. When the brake lever 11 is manipulated in this state, in the first hydraulic circuit 12, the piston (not illustrated in the drawing) of the master cylinder 21 is depressed to amplify the hydraulic pressure of brake fluid inside the wheel cylinder 24, whereby the brake pad (not illustrated in the drawing) of the brake caliper 23 is pressed against the rotor 3a of the front wheel 3 to brake the front wheel 3. Meanwhile, when the brake pedal 13 is manipulated, in the second hydraulic circuit 14, the piston (not illustrated in the drawing) of the master cylinder 21 is depressed to amplify the hydraulic pressure of brake fluid inside the wheel cylinder 24, whereby the brake pad (not illustrated in the drawing) of the brake caliper 23 is pressed against the rotor 4a of the rear wheel 4 to brake the rear wheel 4.

Outputs from the various sensors (such as the master cylinder hydraulic pressure sensor 34, the wheel cylinder hydraulic pressure sensor 35, a wheel speed sensor, and an acceleration sensor) are input to the control unit 75. In response to such outputs, the control unit 75 outputs commands, controlling the operations of the motor 40, the valves, and the like, to execute a pressure reducing control operation, a pressure amplifying control operation, and the like.

For example, when the hydraulic pressure of brake fluid inside the wheel cylinder 24 of the first hydraulic circuit 12 is excessive or likely to be excessive, the control unit 75 executes an operation to reduce the hydraulic pressure of brake fluid inside the wheel cylinder 24 of the first hydraulic circuit 12. In this event, in the first hydraulic circuit 12, the control unit 75 drives the motor 40 while performing control to energize the inlet valve 28, to energize the outlet valve 29, to de-energize the switching valve 32, and to de-energize the pressure amplifying valve 33. Meanwhile, when the hydraulic pressure of brake fluid inside the wheel cylinder 24 of the second hydraulic circuit 14 is excessive or likely to be excessive, the control unit 75 executes an operation to reduce the hydraulic pressure of brake fluid inside the wheel cylinder 24 of the second hydraulic circuit 14. In this event, in the second hydraulic circuit 14, the control unit 75 drives the motor 40 while performing control to energize the inlet valve 28, to energize the outlet valve 29, to de-energize the switching valve 32, and to de-energize the pressure amplifying valve 33.

Thereby, the brake hydraulic pressure control system 70 is capable of executing an anti-lock braking operation of the first hydraulic circuit 12 by controlling the hydraulic pressure of brake fluid inside the wheel cylinder 24 of the first hydraulic circuit 12. In addition, the brake hydraulic pressure control system 70 is capable of executing an anti-lock braking operation of the second hydraulic circuit 14 by controlling the hydraulic pressure of brake fluid inside the wheel cylinder 24 of the second hydraulic circuit 14. In other words, the motor 40 which is the driving source for the pump devices 31 is driven at least at the time of decreasing the hydraulic pressures of the first hydraulic circuit 12 and the second hydraulic circuit 14. To put it another way, the pump devices 31 are configured to decrease at least the hydraulic pressures of the first hydraulic circuit 12 and the second hydraulic circuit 14.

On the other hand, for example, when the hydraulic pressure of brake fluid inside the wheel cylinder 24 of the first hydraulic circuit 12 is deficient or likely to be deficient, the control unit 75 executes an operation to amplify the hydraulic pressure of brake fluid inside the wheel cylinder 24 of the first hydraulic circuit 12. In this event, in the first hydraulic circuit 12, the control unit 75 drives the motor 40 while performing control to de-energize the inlet valve 28, to de-energize the outlet valve 29, to energize the switching valve 32, and to energize the pressure amplifying valve 33. Meanwhile, when the hydraulic pressure of brake fluid inside the wheel cylinder 24 of the second hydraulic circuit 14 is deficient or likely to be deficient, the control unit 75 executes an operation to amplify the hydraulic pressure of brake fluid inside the wheel cylinder 24 of the second hydraulic circuit 14. In this event, in the second hydraulic circuit 14, the control unit 75 drives the motor 40 while performing control to de-energize the inlet valve 28, to de-energize the outlet valve 29, to energize the switching valve 32, and to energize the pressure amplifying valve 33.

Thereby, the brake hydraulic pressure control system 70 is capable of executing an automatic pressure amplifying operation of the first hydraulic circuit 12 by controlling the hydraulic pressure of brake fluid inside the wheel cylinder 24 of the first hydraulic circuit 12. In addition, the brake hydraulic pressure control system 70 is capable of executing an automatic pressure amplifying operation of the second hydraulic circuit 14 by controlling the hydraulic pressure of brake fluid inside the wheel cylinder 24 of the second hydraulic circuit 14.

<Configuration of Brake Hydraulic Pressure Control System>

In the brake hydraulic pressure control system 70, the substrate 80, the motor 40, and the control board 76 are unitized. Note that, in this embodiment, the components other than the motor 40 which are provided to the substrate 80 (such as the inlet valve 28, the outlet valve 29, the accumulator 30, the pump device 31, the switching valve 32, the pressure amplifying valve 33, the master cylinder hydraulic pressure sensor 34, and the wheel cylinder hydraulic pressure sensor 35) are also unitized with the substrate 80 and the control board 76. In the following description, the configuration of the unitized portion of the brake hydraulic pressure control system 70 is described.

Figure 3:
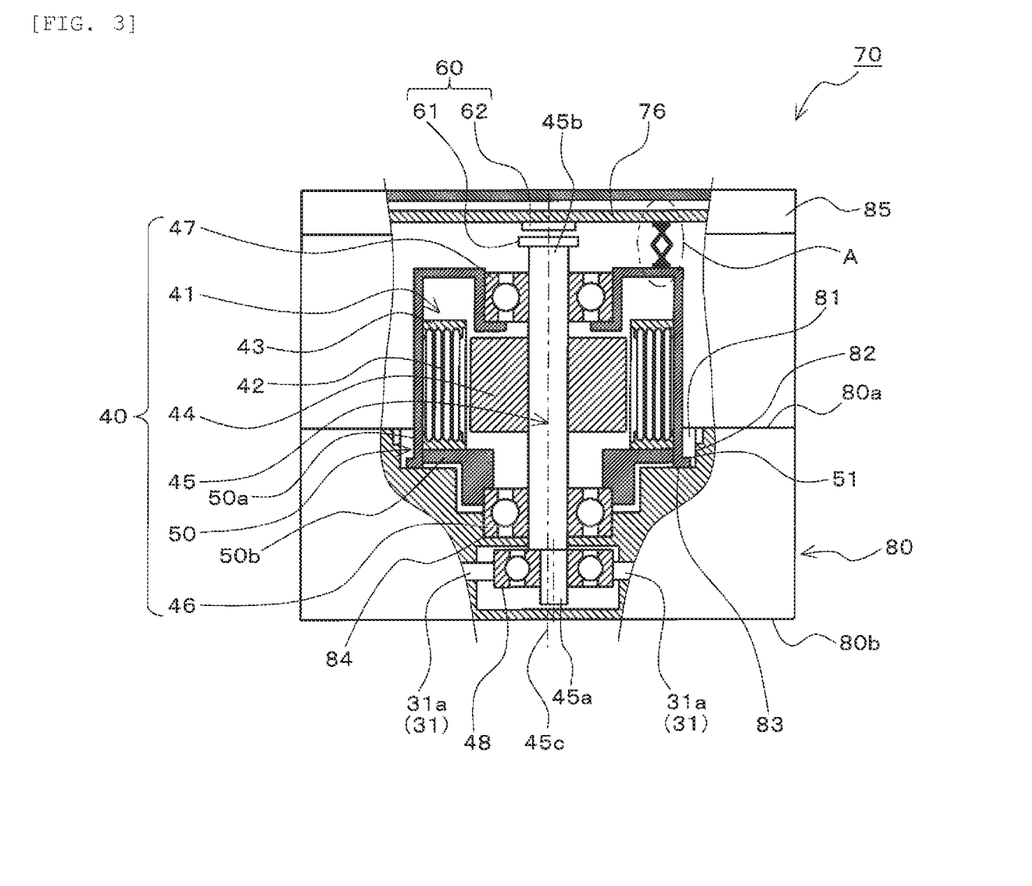
FIG. 3 is a view illustrating, as seen from above, a unitized portion of a brake hydraulic pressure control system according to the embodiment of the present invention in a state where the unitized portion of the brake hydraulic pressure control system according to the embodiment of the present invention is mounted to the straddle-type vehicle, a part of which is illustrated by cross section.

FIG. 3 is a view illustrating, as seen from above, the unitized portion of the brake hydraulic pressure control system according to the embodiment of the present invention in a state where the unitized portion of the brake hydraulic pressure control system according to the embodiment of the present invention is mounted to the straddle-type vehicle, a part of which is illustrated by cross section.

The substrate 80 described above is formed of metal such as aluminum, and has the shape of a substantially rectangular solid, for example. This substrate 80 includes a first surface 80a and a second surface 80b. A housing 85 is connected to the first surface 80a. In addition, the control board 76 is housed in the housing 85. The second surface 80b is the opposite surface of the first surface 80a. Note that, the surfaces of the substrate 80 may include a stepped portion or a curved portion.

The motor 40 is attached to the substrate 80. This motor 40 includes: a stator 41; a rotor 44; an output shaft 45; a bearing 46; a bearing 47; and a motor housing 50. A substantially cylindrical through hole is formed in the stator 41. The rotor 44 has a substantially cylindrical shape, and is disposed inside the through hole of the stator 41 so as to be rotatable with respect to the stator 41. The output shaft 45 is secured to this rotor 44. The output shaft 45 is secured to the rotor 44 in such a way that both an end part 45a and an end part 45b of the output shaft 45 protrude from the rotor 44.

The bearing 46 is configured to rotatably support the output shaft 45 at a position between the end part 45a and the rotor 44. The bearing 47 is configured to rotatably support the output shaft 45 at a position between the end part 45b and the rotor 44. The motor housing 50 constitutes the outline of the motor 40. In this embodiment, the motor housing 50 includes: a metal part 50a which is formed of metal; and a resin part 50b which is formed of a material containing resin. The metal part 50a is formed by sheet metal machining, for example, while the resin part 50b is formed by molding, for example. The stator 41 and the rotor 44 are housed in the motor housing 50. In addition, the motor housing 50 holds the bearing 46 and the bearing 47. Specifically, the bearing 46 is held by the resin part 50b, while the bearing 47 is held by the metal part 50a. Further, in this embodiment, the bearing 46 is held by the motor housing 50 in such a way that a part of the bearing 46 protrudes from the motor housing 50 toward the end part 45a of the output shaft 45.

Here, existing motors include a pair of bearings (corresponding to the bearing 46 and the bearing 47 according to this embodiment) which rotatably support an output shaft. In addition, in the existing motors, the output shaft is loosely fitted to at least one of the pair of bearings with a clearance therebetween. As in the case of the existing motors, in the motor 40 according to this embodiment, when the output shaft 45 is fitted to the bearing 46 and the bearing 47, the output shaft 45 is loosely fitted to at least one of the bearing 46 and the bearing 47 with a clearance therebetween. Specifically, in this embodiment, the output shaft 45 of the motor 40 is tightly fitted to the bearing 46 with no clearance therebetween, and is loosely fitted to the bearing 47 with a clearance therebetween.

The motor 40 according to this embodiment is a brushless motor. By using a brushless motor as the motor 40, it is possible to make the brake hydraulic pressure control system 70 longer lasting as compared to the case of using a brushed motor as the motor 40. In this embodiment, since the motor 40 is a brushless motor, the stator 41 includes a coil 42. In addition, the coil 42 is connected to the control board 76 with wires, terminals, or the like (not illustrated in the drawing). When power is supplied to the coil 42 from the control board 76, electric current flows through the coil 42, whereby a magnetic field is generated. The action of this magnetic field on the rotor 44 makes the rotor 44 and the output shaft 45 rotate about a rotational axis 45c. Then, the rotation of the rotor 44 and the output shaft 45 drives the pump device 31 in the following way.

The pump device 31 includes a piston 31a which is configured to perform a translatory reciprocating movement. In addition, an eccentric body 48 which is configured to bear an end part of the piston 31a is attached to the output shaft 45 of the motor 40 in a region between a portion of the output shaft supported by the bearing 46 and the end part 45a. The central axis of the eccentric body 48 is eccentric with respect to the rotational axis 45c. Thereby, when the eccentric body 48 rotates together with the rotor 44 and the output shaft 45, the piston 31a of the pump device 31 that is pressed against the outer circumferential surface of the eccentric body 48 performs a reciprocating movement, whereby brake fluid is conveyed from the inlet side toward the outlet side of the pump device 31.

Note that, the motor 40 may have a configuration other than the configuration described above. For example, the motor 40 may have such a configuration that the motor includes multiple gears such as planetary gears, and the output shaft 45 and the eccentric body 48 are connected to each other via these gears. Alternatively, for example, the motor 40 may include a cover, which covers the configuration of the motor 40, at a position outside the motor housing 50.

Here, in existing brake hydraulic pressure control systems, a motor which is a driving source of a pump device is attached to a second surface of a substrate. In other words, in the existing brake hydraulic pressure control systems, the motor which is a driving source of the pump device is provided outside the substrate and the housing. On the other hand, in the brake hydraulic pressure control system 70 according to this embodiment, the motor 40 is attached to the first surface 80a of the substrate 80. Thereby, in a state in which the housing 85 is connected to the substrate 80, the motor 40 is disposed in a space surrounded by the substrate 80 and the housing 85. By installing the motor 40 in this manner, it is possible to reduce the size of the brake hydraulic pressure control system 70 as compared to the existing brake hydraulic pressure control systems.

In addition, in this embodiment, a region of the output shaft 45 between the portion where the eccentric body 48 is attached and the end part 45a is free. To put it another way, the region of the output shaft 45 between the portion where the eccentric body 48 is attached and the end part 45a is not supported by any bearing. Thereby, it is not necessary to prepare a space for installing such a bearing in the substrate 80, whereby the brake hydraulic pressure control system 70 can be further reduced in size.

Further, in the existing brake hydraulic pressure control systems, the motor is secured to the substrate by being fastened thereto with bolts. Specifically, in the existing brake hydraulic pressure control systems, multiple through holes are formed in a flange part of the motor, and the bolts are inserted into the respective through holes. Meanwhile, in the existing brake hydraulic pressure control systems, multiple female screw parts are formed in the substrate. Thus, in the existing brake hydraulic pressure control systems, the motor is secured to the substrate in such a way that the bolts inserted in the through holes of the flange part of the motor are respectively screwed into the female screw parts of the substrate and thereby the flange part of the motor is pinched between the heads of the bolts and the substrate.

In the brake hydraulic pressure control system 70 according to this embodiment, the motor 40 may also be secured to the substrate 80 by fastening with bolts as in the case of the existing systems. However, in this embodiment, the motor 40 is secured to the substrate 80 by so-called crimping. Here, the direction of the rotational axis 45c of the output shaft 45 is assumed as the direction of thrust. A portion where the motor 40 is secured to the substrate 80 by crimping mainly bears a load in the direction of thrust. Specifically, the motor housing 50 of the motor 40 includes a flange 51 which protrudes outward. More specifically, the metal part 50a of the motor housing 50 includes the flange 51 which protrudes outward. A concave part 81 into which the flange 51 is inserted is formed in the substrate 80. Note that, a bottom part 83 of the concave part 81 may include a stepped portion or a curved portion. As described above, in this embodiment, the motor 40 is disposed in the space surrounded by the substrate 80 and the housing 85. Thus, the concave part 81 is open toward the housing 85. In addition, a plastic deformation part 82 is formed in the inner circumferential surface of the concave part 81. The plastic deformation part 82 according to this embodiment is a stepped part such that the inner circumferential surface of the concave part 81 is shifted in a direction away from the outer circumferential surface of the motor 40. For example, the plastic deformation part 82 is disposed in the inner circumferential surface of the concave part 81 at a pitch of 90 degrees.

When the motor 40 is secured to the substrate 80, the flange 51 of the motor housing 50 is inserted into the concave part 81 so that the eccentric body 48 attached to the output shaft 45 is located inside the substrate 80. Moreover, the flange 51 of the motor housing 50 is inserted into the concave part 81 until the flange is brought into contact with the bottom part 83 of the concave part 81. In this state, a jig is inserted into a space of the plastic deformation part 82 of the concave part 81 on the first surface 80a side, and the plastic deformation part 82 is plastic deformed by application of pressure. In this way, the motor 40 is secured to the substrate 80 in such a way that the flange 51 of the motor housing 50 is pinched between the plastic deformation part 82, formed in the inner circumferential surface of the concave part 81, and the bottom part 83 of the concave part 81. By securing the motor 40 to the substrate 80 by crimping in this manner, it is not necessary to prepare bolts for securing the motor 40, and also not necessary to form female screw parts, into which the bolts are screwed, in the substrate 80. Accordingly, the brake hydraulic pressure control system 70 can be further reduced in size.

In the meantime, in the case of using a brushless motor, a detection mechanism which is configured to detect the rotation state of an output shaft of the brushless motor is heretofore provided. The brake hydraulic pressure control system 70 according to this embodiment also includes a detection mechanism 60 for detecting the rotation state of the output shaft 45 of the motor 40 which is a brushless motor. Specifically, in this embodiment, the detection mechanism 60 is used to detect the rotation position and the rotation speed of the output shaft 45 as the rotation state of the output shaft 45.

The detection mechanism 60 includes: a rotation element 61 which is configured to rotate together with the output shaft 45; and a sensor 62 which is configured to detect the rotation position of the rotation element 61. Various rotation elements having been used in existing detection mechanisms can be used as the rotation element 61. Likewise, various sensors having been used in existing detection mechanisms can be used as the sensor 62. For example, a permanent magnet can be used as the rotation element 61. In this case, a sensor using a Hall element can be used as the sensor 62, for example. Alternatively, for example, a disc having a through hole formed therein or a disc to which a reflector plate is mounted can be used as the rotation element 61. In this case, a sensor using a light emitting element and a light receiving element can be used as the sensor 62, for example.

In order for the detection mechanism 60 to accurately detect the rotation state of the output shaft 45, what is important is the positional accuracy at the time of installing the motor 40 in the space surrounded by the substrate 80 and the housing 85. Here, the installation space for the motor 40 is limited in the space surrounded by the substrate 80 and the housing 85. To deal with this, in this embodiment, the motor 40 is disposed in the space surrounded by the substrate 80 and the housing 85 in the following way.

A concave part 84 which is open toward the housing 85 is formed in the substrate 80. In this embodiment, the concave part 84 is formed in the bottom part 83 of the concave part 81. In addition, the bearing 46 of the motor 40 is inserted into the concave part 84. Specifically, as described above, the bearing 46 is held by the motor housing 50 in such a way that a part of the bearing 46 protrudes from the motor housing 50 toward the end part 45a of the output shaft 45, and the part of the bearing 46 protruding from the motor housing 50 is inserted into the concave part 84. The bearing 46 which is configured to rotatably support the output shaft 45 is originally a member included in the motor 40. In other words, the brake hydraulic pressure control system 70 according to this embodiment positions the motor 40 using the bearing 46 originally included in the motor 40. Accordingly, in the brake hydraulic pressure control system 70 according to this embodiment, it is possible to improve the positional accuracy of the motor 40 even in the case of installing the motor 40 in the space surrounded by the substrate 80 and the housing 85.

Further, in this embodiment, the bearing 46 is fitted into the concave part 84. With such a configuration, it is possible to further improve the positional accuracy of the motor 40. In addition, such a configuration can also bring about the following effect. When the pump device 31 is driven, a load from the piston 31a of the pump device 31 acts on the output shaft 45 of the motor 40 which is a driving source of the pump device 31 via the eccentric body 48. Since the bearing 46 is fitted into the concave part 84, a region between the bearing 46 and the concave part 84 can also bear this load in addition to the portion where the motor 40 is secured to the substrate 80 by crimping. Accordingly, since the bearing 46 is fitted into the concave part 84, it is possible to improve the reliability of the brake hydraulic pressure control system 70. In addition, in this embodiment, the bearing 46 is loosely fitted into the concave part 84 with a clearance therebetween. With such a configuration, it is possible to fit the bearing 46 into the concave part 84 easily, and thus reduce the number of man-hours for assembling the brake hydraulic pressure control system 70.

Note that, the output shaft 45 of the motor 40 may be tightly fitted to the bearing 47 with no clearance therebetween as well as being tightly fitted to the bearing 46 with no clearance therebetween. Thereby, it is possible to inhibit the runout of the output shaft 45 from occurring when a load acts on the output shaft 45 at the time of driving the pump device 31. In other words, the runout of the rotation element 61 that rotates together with the output shaft 45 is also inhibited. Accordingly, it is possible to detect the rotation state of the output shaft 45 further accurately.

In addition, in this embodiment, the rotation element 61 is located between the output shaft 45 and the control board 76. Specifically, in this embodiment, the rotation element 61 is attached to the end part 45b of the output shaft 45. Since the rotation element 61 is located between the output shaft 45 and the control board 76, it is possible to mount the sensor 62 to the control board 76. This makes it unnecessary to provide an additional control board other than the control board 76 for mounting the sensor 62 thereto, whereby the brake hydraulic pressure control system 70 can be further reduced in size.

In the meantime, those skilled in the art having known the brake hydraulic pressure control system 70 according to this embodiment might be concerned about an excessive temperature increase of the coil 42 of the motor 40 by the installation of the motor 40 in the space surrounded by the substrate 80 and the housing 85. However, the brake hydraulic pressure control system 70 according to this embodiment can suppress a temperature increase of the coil 42 of the motor 40. Specifically, as described above, the stator 41 of the motor 40 includes the coil 42. In addition, the stator 41 of the brake hydraulic pressure control system 70 according to this embodiment includes a mold part 43 which covers the coil 42 with a mold member. Further, this mold part 43 is in contact with the motor housing 50. In this embodiment, the mold part 43 is in contact with both the metal part 50a and the resin part 50b of the motor housing 50. The motor housing 50 is surely in contact with some sort of object other than the mold part 43. For this reason, in the brake hydraulic pressure control system 70 according to this embodiment, heat generated by the coil 42 is transmitted to the object, which is in contact with the motor housing 50, by way of the mold part 43 and the motor housing 50.

The coil 42 has a substantially circular shape in cross section. For this reason, in the case of not including the mold part 43, even if the outer circumferential surface of the coil 42 and the motor housing 50 are in contact with each other, the area of contact between the coil 42 and the motor housing 50 is small. Specifically, when the cross section of the coil 42 is observed, the coil 42 having a substantially circular shape in cross section and the motor housing 50 are in point contact with each other. For this reason, in the case of not including the mold part 43, even if the outer circumferential surface of the coil 42 and the motor housing 50 are in contact with each other, the amount of heat transmitted from the coil 42 to the motor housing 50 is small. On the other hand, in the case of including the mold part 43, the mold part 43 can be in contact with a larger area of the outer circumferential surface of the coil 42. In addition, the mold part 43 can be in contact with a larger area of the motor housing 50 than the area of contact in the case where the coil 42 and the motor housing 50 are in direct contact with each other.

For this reason, by including the mold part 43, it is possible to increase the amount of heat transmitted from the coil 42 to the motor housing 50 as compared to the case where the coil 42 and the motor housing 50 are in direct contact with each other. Thus, by including the mold part 43, it is possible to transmit heat generated by the coil 42 sufficiently to the object, which is in contact with the motor housing 50, by way of the mold part 43 and the motor housing 50. Accordingly, by including the mold part 43, it is possible to discharge heat generated by the coil 42 to outside the space surrounded by the substrate 80 and the housing 85, and thereby suppress a temperature increase of the coil 42 of the motor 40.

Note that, a specific kind of the mold member of the mold part 43 is not particularly limited. For example, a material such as glass or metal can be used as the mold member. Alternatively, a material containing resin may also be used as the mold member, for example. In this embodiment, resin containing glass fiber is used as the mold member of the mold part 43. Molding of the mold part 43 becomes easier by using a material containing resin as the mold member of the mold part 43. Note that, in this embodiment, the mold part 43 and the resin part 50b of the motor housing 50 are molded into one unit.

Here, in this embodiment, the motor housing 50 is in contact with the substrate 80. The substrate 80 is a component relatively large in size among the components constituting the brake hydraulic pressure control system 70. In addition, the substrate 80 is made of metal. Thus, since the motor housing 50 is in contact with the substrate 80, it becomes easier to discharge heat generated by the coil 42 to outside the space surrounded by the substrate 80 and the housing 85, whereby a temperature increase of the coil 42 of the motor 40 can be further suppressed.

Further, in this embodiment, as described above, the bearing 46 held by the motor housing 50 is in contact with the substrate 80. For this reason, in the brake hydraulic pressure control system 70 according to this embodiment, heat generated by the coil 42 can be transmitted to the substrate 80 also by way of a path passing through the mold part 43, the motor housing 50, and the bearing 46. Accordingly, the brake hydraulic pressure control system 70 according to this embodiment can further suppress a temperature increase of the coil 42 of the motor 40.

In the meantime, the brake hydraulic pressure control system 70 according to this embodiment includes at least one plate spring 90. The brake hydraulic pressure control system 70 according to this embodiment grounds the control board 76 using the plate spring 90 to suppress the electrostatic charging of the control board 76. Hereinbelow, the configuration of the plate spring 90 and therearound is described using FIG. 3 and FIGS. 4 and 5 to be described later.

Figure 4:
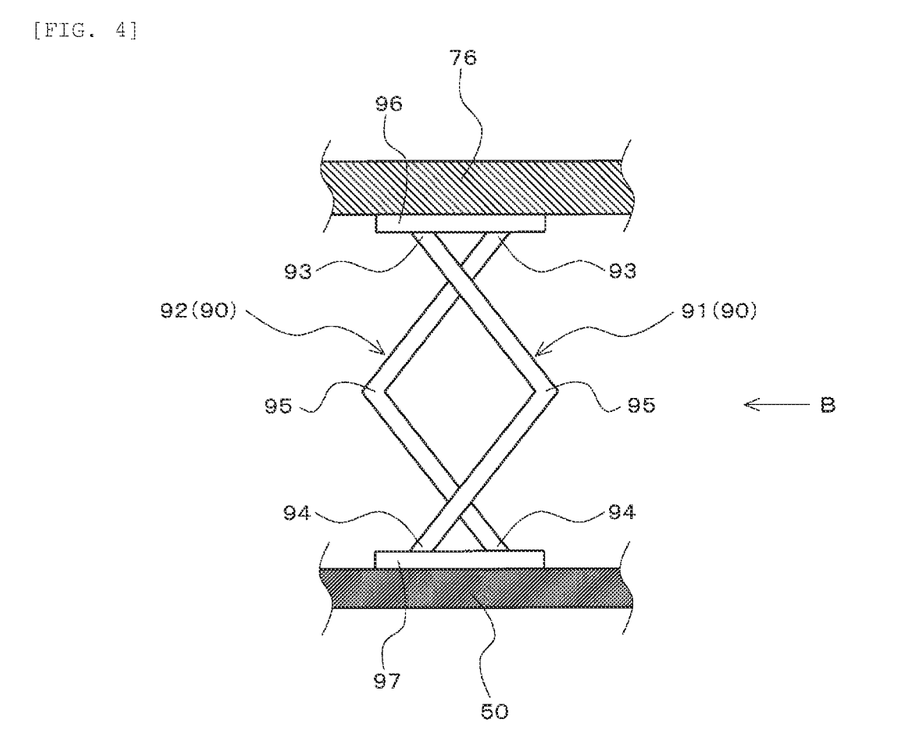
FIG. 4 is an enlarged view of a portion A of FIG. 3.
Figure 5:
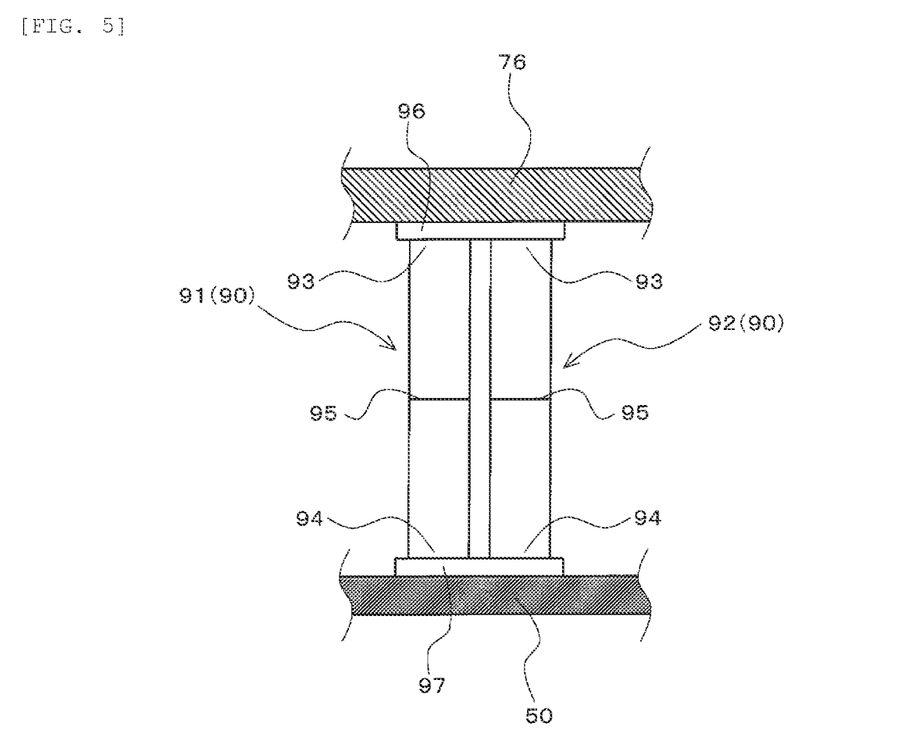
FIG. 5 is a view as seen in the direction of the arrow B in FIG. 4.

FIG. 4 is an enlarged view of a portion A of FIG. 3. Meanwhile, FIG. 5 is a view as seen in the direction of the arrow B in FIG. 4. In other words, FIG. 4 is a view illustrating, as seen from above, the plate spring 90 and therearound in the unitized portion of the brake hydraulic pressure control system 70 in a state where the unitized portion of the brake hydraulic pressure control system 70 is mounted to the straddle-type vehicle 100. Meanwhile, FIG. 5 is a view illustrating, as seen in the transverse direction, the plate spring 90 and therearound in the unitized portion of the brake hydraulic pressure control system 70 in a state where the unitized portion of the brake hydraulic pressure control system 70 is mounted to the straddle-type vehicle 100.

The plate spring 90 is made of metal. Note that, the material of the plate spring 90 is not limited to metal as long as it is conductive, and may be a material such as fiber-reinforced resin. Here, the brake hydraulic pressure control system 70 includes a component which is disposed in the space surrounded by the substrate 80 and the housing 85 and is electrically connected to the substrate 80. Hereinbelow, the component which is disposed in the space surrounded by the substrate 80 and the housing 85 and is electrically connected to the substrate 80 is referred to as an electrically connected component. When the electrically connected component is defined in the above manner, the plate spring 90 is provided between the control board 76 and the electrically connected component. Note that, examples of the electrically connected component include pistons of the inlet valve 28, the outlet valve 29, the switching valve 32, and the pressure amplifying valve 33. In addition, another example of the electrically connected component is the motor housing 50. In this embodiment, the plate spring 90 is provided between the control board 76 and the motor housing 50. Hereinbelow, the detailed configuration of the plate spring 90 is described using the motor housing 50 as an example of the electrically connected component.

The plate spring 90 is expandable and contractable in a direction in which the control board 76 and the motor housing 50 are opposed to each other. In addition, the free length of the plate spring 90 is longer than the distance between the control board 76 and the motor housing 50. To put it differently, the plate spring 90 is compressed between the control board 76 and the motor housing 50. Besides, an end part 93 of the plate spring 90 is connected to the control board 76, whereas an end part 94 of the plate spring 90 is connected to the motor housing 50. Specifically, in this embodiment, the end part 94 of the plate spring 90 is connected to the metal part 50a of the motor housing 50.

Concretely, the end part 93 of the plate spring 90 is electrically connected to the control board 76. In addition, since soldered to the control board 76, the end part 93 of the plate spring 90 is connected to the control board 76 also mechanically. Note that, the state where the end part 93 of the plate spring 90 is connected to the control board 76 includes not only a state where the end part 93 of the plate spring 90 is directly connected to the control board 76 but also a state where the end part 93 of the plate spring 90 is indirectly connected to the control board 76. For example, in order to allow the end part 93 of the plate spring 90 and the control board 76 to be electrically connected to each other reliably for a long period of time, it is conceivable to provide a member formed of a material not easily oxidized, such as silver, between the end part 93 of the plate spring 90 and the control board 76. In this case, in this embodiment, the end part 93 of the plate spring 90 is also referred to as being connected to the control board 76.

In addition, the end part 94 of the plate spring 90 is electrically connected to the motor housing 50. Note that, the state where the end part 94 of the plate spring 90 is connected to the motor housing 50 includes not only a state where the end part 94 of the plate spring 90 is directly connected to the motor housing 50 but also a state where the end part 94 of the plate spring 90 is indirectly connected to the motor housing 50. For example, in order to allow the end part 94 of the plate spring 90 and the motor housing 50 to be electrically connected to each other reliably for a long period of time, it is conceivable to provide a member formed of a material not easily oxidized, such as silver, between the end part 94 of the plate spring 90 and the motor housing 50. In this case, in this embodiment, the end part 94 of the plate spring 90 is also referred to as being connected to the motor housing 50.

In other words, in the brake hydraulic pressure control system 70 according to this embodiment, the control board 76 is electrically connected to the substrate 80 via the plate spring 90 and the motor housing 50. This enables the brake hydraulic pressure control system 70 according to this embodiment to ground the control board 76, and thereby suppress the electrostatic charging of the control board 76.

Here, some of existing brake hydraulic pressure control systems proposed ground the control board with a coil spring made of metal provided between the control board and the electrically connected component. In this respect, the coil spring is susceptible to deform under vibration in a direction perpendicular to a direction in which the coil spring expands and contracts. The direction in which the coil spring expands and contracts indicates the direction in which the control board and the electrically connected component are opposed to each other. If the coil spring is deformed in the direction perpendicular to the direction in which the coil spring expands and contracts, it results in a state where the coil becomes no longer in contact with at least one of the control board and the electrically connected component, and thus grounding of the control board is no longer available. To deal with this, in the existing brake hydraulic pressure control systems, a through hole is formed in a member disposed between the control board and the electrically connected component, and the coil spring is inserted into this through hole. Thereby, the coil spring is held by an inner wall of the through hole. Thus, even when the brake hydraulic pressure control system vibrates, it is possible to inhibit the coil spring from being deformed in the direction perpendicular to the direction in which the coil expands and contracts.

Accordingly, in the existing brake hydraulic pressure control systems which ground the control board using the coil spring, the through hole into which to insert the coil spring needs to be formed in the member disposed between the control board and the electrically connected component. Because this through hole needs to hold the coil spring with its inner wall, high positional accuracy and dimensional accuracy are required at the time of machining the through hole. For this reason, in the existing brake hydraulic pressure control systems which ground the control board using the coil spring, the manufacturing cost of a component having the member disposed between the control board and the electrically connected component inevitably increases, which results in an increase of the manufacturing cost of the brake hydraulic pressure control system.

On the other hand, the plate spring 90 is less susceptible to deform in the direction perpendicular to the direction in which the plate spring 90 expands and contracts as compared to the coil spring. Hence, in the brake hydraulic pressure control system 70 according to this embodiment, it is not necessary to insert the plate spring 90 into a through hole, formed in a member disposed between the control board 76 and the motor housing 50, for the purpose of inhibiting the plate spring 90 from being deformed in the direction perpendicular to the direction in which the plate spring 90 expands and contracts. In other words, in the brake hydraulic pressure control system 70 according to this embodiment, it is not necessary to form the through hole in the member disposed between the control board 76 and the motor housing 50. In addition, even when the brake hydraulic pressure control system 70 according to this embodiment has such a configuration that the plate spring 90 is inserted in to the through hole formed in the member disposed between the control board 76 and the motor housing 50, it is not necessary to cause the through hole to hold the plate spring 90 with its inner wall. For this reason, even when the brake hydraulic pressure control system 70 according to this embodiment has such a configuration that the plate spring 90 is inserted in to the through hole formed in the member disposed between the control board 76 and the motor housing 50, positional accuracy and dimensional accuracy at the time of machining the through hole may be lower than those of the existing through hole for holding the coil spring. To put it another way, in the brake hydraulic pressure control system 70 according to this embodiment, it is possible to reduce the manufacturing cost of the component having the member disposed between the control board 76 and the motor housing 50 as compared to the existing brake hydraulic pressure control systems which ground the control board using the coil spring. Accordingly, the brake hydraulic pressure control system 70 according to this embodiment makes it possible to suppress an increase of the manufacturing cost as compared to the existing brake hydraulic pressure control systems which ground the control board using the coil spring.

In addition, in this embodiment, as described above, the motor housing 50 is used as the electrically connected component. In order for the plate spring 90 and the electrically connected component to be electrically connected to each other stably, it is preferable to make flat a portion of the electrically connected component with which the end part 94 of the plate spring 90 is in contact. In the case of the motor housing 50, since the portion with which the end part 94 of the plate spring 90 is in contact can be easily formed flat, the control board 76 can be grounded more stably.

Further, in this embodiment, the plate spring 90 includes, in its end part 93, a planar part 96 which is in contact with the control board 76. Due to the planar part 96, the area of contact between the plate spring 90 and the control board 76 is increased, whereby the control board 76 can be grounded more stably. Moreover, in this embodiment, the plate spring 90 includes, in its end part 94, a planar part 97 which is in contact with the motor housing 50. Due to the planar part 97, the area of contact between the plate spring 90 and the motor housing 50 is increased, whereby the control board 76 can be grounded more stably.

Note that, as seen in the width direction of the plate spring 90, the plate spring 90 can have various shapes such as an arc shape. Note that, the width direction of the plate spring 90 indicates the width direction of a plate member for forming the plate spring 90. The width direction of the plate spring 90 is a direction orthogonal to the paper surface of FIG. 4, and is a lateral direction with respect to the paper surface of FIG. 5. Here, the plate spring 90 according to this embodiment has the following shape. The plate spring 90 includes, at at least one position of a portion between the end part 93 and the end part 94, a bend part 95 which bends in the thickness direction of the plate spring 90. Note that, the thickness direction of the plate spring 90 indicates the thickness direction of the plate member for forming the plate spring 90. To put it differently, when the plate spring 90 includes one bend part 95, the plate spring 90 substantially has the shape of a V as seen in the width direction of the plate spring 90. Meanwhile, when the plate spring 90 includes multiple bend parts 95, the plate spring 90 has a zigzag shape as seen in the width direction of the plate spring 90. By forming the plate spring 90 in such shapes, the plate spring 90 can be formed easily.

In addition, in this embodiment, the plate spring 90 includes a first plate spring 91 and a second plate spring 92. Further, the bend part 95 of the first plate spring 91 and that of the second plate spring 92 bend in opposite directions from each other. When how the plate spring 90 is deformed in the direction perpendicular to the direction in which the plate spring 90 expands and contracts is observed at the time when the brake hydraulic pressure control system 70 vibrates, the plate spring 90 is more likely to deform in the direction perpendicular to the width direction of the plate spring 90 than in the width direction of the plate spring 90. The direction perpendicular to the width direction of the plate spring 90 is a lateral direction with respect to the paper surface of FIG. 4. Besides, when the brake hydraulic pressure control system 70 vibrates, the likelihood of deformation of the plate spring 90 in the left direction with respect to the paper surface of FIG. 4 and the likelihood of deformation of the plate spring 90 in the right direction with respect to the paper surface of FIG. 4 vary depending on the direction of bend of the bend part 95. Thus, in this embodiment, the bend part 95 of the first plate spring 91 and that of the second plate spring 92 bend in opposite directions from each other. By forming the first plate spring 91 and the second plate spring 92 in this manner, in the lateral direction with respect to the paper surface of FIG. 4, these plate springs are likely to bend in opposite directions from each other. As a result, by forming the first plate spring 91 and the second plate spring 92 in this manner, the first plate spring 91 and the second plate spring 92 as a whole become less likely to deform in both directions in the lateral direction with respect to the paper surface of FIG. 4. Accordingly, by forming the first plate spring 91 and the second plate spring 92 in this manner, the control board 76 can be grounded more stably. Note that, in this embodiment, the planar part 96 of the first plate spring 91 and the planar part 96 of the second plate spring 92 are formed in one unit, and the planar part 97 of the first plate spring 91 and the planar part 97 of the second plate spring 92 are formed in one unit.

Here, in this embodiment, the state where the bend part 95 of the first plate spring 91 and that of the second plate spring 92 bend in opposite directions from each other does not mean that the bend part 95 of the first plate spring 91 and that of the second plate spring 92 bend in exactly opposite directions from each other. Specifically, the second plate spring 92 in this embodiment takes such a posture that the first plate spring 91 is rotated by 180 degrees while a virtual line, extending in the direction in which the control board 76 and the motor housing 50 are opposed to each other, is used as the reference of rotation. While not limited thereto, the second plate spring 92 may take such a posture that the first plate spring 91 is rotated by less than 180 degrees while the virtual line, extending in the direction in which the control board 76 and the motor housing 50 are opposed to each other, is used as the reference of rotation. In this respect, the second plate spring 92 may take any posture as long as it takes such a posture that the first plate spring 91 is rotated by more than 90 degrees while the virtual line, extending in the direction in which the control board 76 and the motor housing 50 are opposed to each other, is used as the reference of rotation. Even when the second plate spring 92 takes the above posture, in this embodiment, such a posture is also referred to as the state where the bend part 95 of the first plate spring 91 and that of the second plate spring 92 bend in opposite directions from each other.

In addition, as illustrated in FIG. 5, when the first plate spring 91 and the second plate spring 92 are observed in the direction perpendicular to the width direction of the first plate spring 91, in this embodiment, the first plate spring 91 and the second plate spring 92 are arranged so as not to overlap with each other. While not limited thereto, when the first plate spring 91 and the second plate spring 92 are observed in the direction perpendicular to the width direction of the first plate spring 91, the first plate spring 91 and the second plate spring 92 may overlap with each other. Besides, as illustrated in FIG. 4, when the first plate spring 91 and the second plate spring 92 are observed in the width direction of the first plate spring 91, in this embodiment, the first plate spring 91 and the second plate spring 92 are arranged so as to overlap with each other. While not limited thereto, when the first plate spring 91 and the second plate spring 92 are observed in the width direction of the first plate spring 91, the first plate spring 91 and the second plate spring 92 do not necessarily have to overlap with each other.

Here, the brake hydraulic pressure control system 70 according to this embodiment is mounted to the straddle-type vehicle 100 while the plate spring 90 takes a posture as illustrated in FIGS. 3 to 5. Specifically, when the brake hydraulic pressure control system 70 is mounted to the straddle-type vehicle 100, the plate spring 90 takes such a posture that the width direction of the plate spring 90 does not extend horizontally. More specifically, in this embodiment, when the brake hydraulic pressure control system 70 is mounted to the straddle-type vehicle 100, the plate spring 90 takes such a posture that the width direction of the plate spring 90 extends in a vertical direction.

The straddle-type vehicle 100 is likely to vibrate in the vertical direction during traveling. Meanwhile, as described previously, the plate spring 90 in which the bend part 95 is formed is likely to deform in the direction perpendicular to the width direction of the plate spring 90. For this reason, by setting the brake hydraulic pressure control system 70 in such a posture that the width direction of the plate spring 90 does not extend horizontally when the system is mounted to the straddle-type vehicle 100, the direction in which the plate spring 90 is likely to deform becomes different from the vertical direction in which the straddle-type vehicle 100 is likely to vibrate greatly during traveling. Accordingly, by setting the brake hydraulic pressure control system 70 in such a posture that the width direction of the plate spring 90 does not extend horizontally when the system is mounted to the straddle-type vehicle 100, it is possible to further inhibit the plate spring 90 from becoming not in contact with the motor housing 50, whereby the control board 76 can be grounded more stably.

<Effect of Brake Hydraulic Pressure Control System>

The effect of the brake hydraulic pressure control system 70 according to this embodiment is described.

The brake hydraulic pressure control system 70 according to this embodiment includes: the substrate 80 in which the sub-flow channel 26 for brake fluid is formed; the motor 40 which is a driving source for the pump device 31 provided in the sub-flow channel 26; the control board 76 for the motor 40; and the housing 85 connected to the substrate 80. The motor 40 includes: the stator 41; the rotor 44; and the output shaft 45 secured to the rotor 44. The control board 76 is housed in the housing 85. The motor 40 is a brushless motor, and is disposed in the space surrounded by the substrate 80 and the housing 85. The output shaft 45 is secured to the rotor 44 in such a way that both the end part 45a which is a first end part and the end part 45b which is a second end part of the output shaft 45 protrude from the rotor 44. The motor 40 also includes: the bearing 46 which is a first bearing; the bearing 47 which is a second bearing; and the motor housing 50. The bearing 46 is configured to rotatably support the output shaft 45 at a position between the end part 45a and the rotor 44. The bearing 47 is configured to rotatably support the output shaft 45 at a position between the end part 45b and the rotor 44. The stator 41 and the rotor 44 are housed in the motor housing 50. In addition, the motor housing 50 holds the bearing 46 and the bearing 47. The brake hydraulic pressure control system 70 further includes the detection mechanism 60 which is configured to detect the rotation state of the output shaft 45. In addition, the concave part 84 which is a first concave part open toward the housing 85 is formed in the substrate 80, and the bearing 46 of the motor 40 is inserted into the concave part 84.

In the brake hydraulic pressure control system 70 having the above configuration, since the motor 40 is disposed in the space surrounded by the substrate 80 and the housing 85, it is possible to reduce the size of the brake hydraulic pressure control system 70 as compared to the existing brake hydraulic pressure control systems. In addition, the brake hydraulic pressure control system 70 having the above configuration positions the motor 40 by inserting the bearing 46, originally included in the motor 40, into the concave part 84. Accordingly, in the brake hydraulic pressure control system 70 having the above configuration, it is possible to improve the positional accuracy of the motor 40 even in the case of installing the motor 40 in the space surrounded by the substrate 80 and the housing 85.

It is preferable that the pump device 31 includes the piston 31a which is configured to perform a translatory reciprocating movement. In addition, the eccentric body 48 which is configured to bear the end part of the piston 31a is attached to the output shaft 45 in the region between the portion of the output shaft supported by the bearing 46 and the end part 45a. Besides, the region of the output shaft 45 between the portion where the eccentric body 48 is attached and the end part 45a is free. With such a configuration, it is not necessary to prepare, in the substrate 80, a space for installing a bearing which is configured to support the output shaft 45 so that it is rotatable in this region, whereby the brake hydraulic pressure control system 70 can be further reduced in size.

It is preferable that the bearing 46 is fitted into the concave part 84. With such a configuration, it is possible to further improve the positional accuracy of the motor 40. In addition, it is preferable that the bearing 46 is loosely fitted into the concave part 84 with a clearance therebetween. With such a configuration, it is possible to fit the bearing 46 into the concave part 84 easily, and thus reduce the number of man-hours for assembling the brake hydraulic pressure control system 70.

It is preferable that the motor housing 50 includes the flange 51 which protrudes outward. The concave part 81 which is a second concave part open toward the housing 85 and into which the flange 51 is inserted is formed in the substrate 80. The motor 40 is secured to the substrate 80 in such a way that the flange 51 is pinched between the plastic deformation part 82, formed in the inner circumferential surface of the concave part 81, and the bottom part 83 of the concave part 81. With such a configuration, it is not necessary to prepare bolts for securing the motor 40, and also not necessary to form female screw parts, into which the bolts are screwed, in the substrate 80. Accordingly, the brake hydraulic pressure control system 70 can be further reduced in size.

It is preferable that the detection mechanism 60 includes: the rotation element 61 which is configured to rotate together with the output shaft 45; and the sensor 62 which is configured to detect the rotation position of the rotation element 61. The rotation element 61 is located between the output shaft 45 and the control board 76, and the sensor 62 is mounted to the control board 76. Such a configuration makes it unnecessary to provide an additional control board other than the control board 76 for mounting the sensor 62 thereto, whereby the brake hydraulic pressure control system 70 can be further reduced in size.

Hereinabove, one example of the brake hydraulic pressure control system and the straddle-type vehicle according to the present invention has been described in the embodiment; however, the brake hydraulic pressure control system and the straddle-type vehicle according to the present invention are not limited to those described in the embodiment. For example, the brake hydraulic pressure control system and the straddle-type vehicle according to the present invention may be constituted by combining all or part of the configurations of the embodiment.

REFERENCE SIGNS LIST

1: Trunk
2: Handlebar
3: Front wheel
3a: Rotor
4: Rear wheel
4a: Rotor
10: Brake system
11: Brake lever
12: First hydraulic circuit
13: Brake pedal
14: Second hydraulic circuit
21: Master cylinder
22: Reservoir
23: Brake caliper
24: Wheel cylinder
25: Main flow channel
25a: Main flow channel midstream part
26: Sub-flow channel
26a: Sub-flow channel midstream part
27: Pressure amplifying flow channel
28: Inlet valve
29: Outlet valve
30: Accumulator
31: Pump device
31a: Piston
32: Switching valve
33: Pressure amplifying valve
34: Master cylinder hydraulic pressure sensor
35: Wheel cylinder hydraulic pressure sensor
40: Motor
41: Stator
42: Coil
43: Mold part
44: Rotor
45: Output shaft
45a: End part
45b: End part
45c: Rotational axis
46: Bearing
47: Bearing
48: Eccentric body
50: Motor housing
50a: Metal part 50b: Resin part
51: Flange
60: Detection mechanism
61: Rotation element
62: Sensor
70: Brake hydraulic pressure control system
75: Control unit
76: Control board
80: Substrate
80a: First surface
80b: Second surface
81: Concave part
82: Plastic deformation part
83: Bottom part
84: Concave part
85: Housing
90: Plate spring
91: First plate spring
92: Second plate spring
93: End part
94: End part
95: Bend part
96: Planar part
97: Planar part
100: Straddle-type vehicle
MP: Master cylinder port
WP: Wheel cylinder port

The invention claimed is:

1. A brake hydraulic pressure control system (70) for a straddle-type vehicle (100) comprising:
   a substrate (80) in which a flow channel (26) for brake fluid is formed;
   a motor (40) which includes a stator (41), a rotor (44), and an output shaft (45) secured to the rotor (44), and is a driving source for a pump device (31) provided in the flow channel (26);
   a control board (76) of the motor (40); and
   a housing (85) which houses therein the control board (76), and is connected to the substrate (80), wherein
   the motor (40) is a brushless motor, and is disposed in a space surrounded by the substrate (80) and the housing (85),
   the output shaft (45) is secured to the rotor (44) in such a way that both a first end part (45a) and a second end part (45b) of the output shaft (45) protrude from the rotor (44),
   the motor (40) includes
      a first bearing (46) which is configured to rotatably support the output shaft (45) at a position between the first end part (45a) and the rotor (44),
      a second bearing (47) which is configured to rotatably support the output shaft (45) at a position between the second end part (45b) and the rotor (44), and
      a motor housing (50) which houses therein the stator (41) and the rotor (44), and holds the first bearing (46) and the second bearing (47),
   the brake hydraulic pressure control system (70) further includes a detection mechanism (60) which is configured to detect a rotation state of the output shaft (45),
   a first concave part (84) which opens toward the housing (85) is formed in the substrate (80), and
   the first bearing (46) of the motor (40) is inserted into the first concave part (84),
   wherein the pump device (31) includes a piston (31a) which is configured to perform a translatory reciprocating movement,
   an eccentric body (48) which is configured to bear an end part of the piston (31a) is attached to the output shaft (45) in a region between a portion of the output shaft supported by the first bearing (46) and the first end part (45a), and
   a region of the output shaft (45) between the portion where the eccentric body (48) is attached and the first end part (45a) is free.

2. The brake hydraulic pressure control system (70) according to claim 1, wherein the first bearing (46) is fitted into the first concave part (84).

3. The brake hydraulic pressure control system (70) according to claim 2, wherein
   the motor housing (50) includes a flange (51) which protrudes outward,
   a second concave part (81) which is open toward the housing (85) and into which the flange (51) is inserted is formed in the substrate (80), and
   the motor (40) is secured to the substrate (80) in such a way that the flange (51) is pinched between a plastic deformation part (82), formed in an inner circumferential surface of the second concave part (81), and a bottom part (83) of the second concave part (81).

4. The brake hydraulic pressure control system (70) according to claim 2, wherein the first bearing (46) is loosely fitted into the first concave part (84) with a clearance therebetween.

5. The brake hydraulic pressure control system (70) according to claim 4, wherein
   the motor housing (50) includes a flange (51) which protrudes outward,
   a second concave part (81) which is open toward the housing (85) and into which the flange (51) is inserted is formed in the substrate (80), and
   the motor (40) is secured to the substrate (80) in such a way that the flange (51) is pinched between a plastic deformation part (82), formed in an inner circumferential surface of the second concave part (81), and a bottom part (83) of the second concave part (81).

6. The brake hydraulic pressure control system (70) according to claim 2, wherein
   the motor housing (50) includes a flange (51) which protrudes outward,
   a second concave part (81) which is open toward the housing (85) and into which the flange (51) is inserted is formed in the substrate (80), and
   the motor (40) is secured to the substrate (80) in such a way that the flange (51) is pinched between a plastic deformation part (82), formed in an inner circumferential surface of the second concave part (81), and a bottom part (83) of the second concave part (81).

7. The brake hydraulic pressure control system (70) according to claim 2, wherein the first bearing (46) is loosely fitted into the first concave part (84) with a clearance therebetween.

8. The brake hydraulic pressure control system (70) according to claim 7, wherein
   the motor housing (50) includes a flange (51) which protrudes outward,
   a second concave part (81) which is open toward the housing (85) and into which the flange (51) is inserted is formed in the substrate (80), and
   the motor (40) is secured to the substrate (80) in such a way that the flange (51) is pinched between a plastic deformation part (82), formed in an inner circumferential surface of the second concave part (81), and a bottom part (83) of the second concave part (81).

9. The brake hydraulic pressure control system (70) according to claim 1, wherein
the detection mechanism (60) includes:
- a rotation element (61) which is configured to rotate together with the output shaft (45); and
- a sensor (62) which is configured to detect a rotation position of the rotation element (61), the rotation element (61) is located between the output shaft (45) and the control board (76), and the sensor (62) is mounted to the control board (76).

10. A straddle-type vehicle (100) comprising the brake hydraulic pressure control system (70) according to claim 1.

11. A brake hydraulic pressure control system (70) for a straddle-type vehicle (100) comprising:
- a substrate (80) in which a flow channel (26) for brake fluid is formed;
- a motor (40) which includes a stator (41), a rotor (44), and an output shaft (45) secured to the rotor (44), and is a driving source for a pump device (31) provided in the flow channel (26);
- a control board (76) of the motor (40); and
- a housing (85) which houses therein the control board (76), and is connected to the substrate (80), wherein the motor (40) is a brushless motor, and is disposed in a space surrounded by the substrate (80) and the housing (85), the output shaft (45) is secured to the rotor (44) in such a way that both a first end part (45a) and a second end part (45b) of the output shaft (45) protrude from the rotor (44), the motor (40) includes
- a first bearing (46) which is configured to rotatably support the output shaft (45) at a position between the first end part (45a) and the rotor (44),
- a second bearing (47) which is configured to rotatably support the output shaft (45) at a position between the second end part (45b) and the rotor (44), and
- a motor housing (50) which houses therein the stator (41) and the rotor (44), and holds the first bearing (46) and the second bearing (47), the brake hydraulic pressure control system (70) further includes a detection mechanism (60) which is configured to detect a rotation state of the output shaft (45), a first concave part (84) which opens toward the housing (85) is formed in the substrate (80), wherein the first bearing (46) is fitted into the first concave part (84), and wherein the motor housing (50) includes a flange (51) which protrudes outward, a second concave part (81) which is open toward the housing (85) and into which the flange (51) is inserted is formed in the substrate (80), and the motor (40) is secured to the substrate (80) in such a way that the flange (51) is pinched between a plastic deformation part (82), formed in an inner circumferential surface of the second concave part (81), and a bottom part (83) of the second concave part (81).

12. A brake hydraulic pressure control system (70) for a straddle-type vehicle (100) comprising:
- a substrate (80) in which a flow channel (26) for brake fluid is formed;
- a motor (40) which includes a stator (41), a rotor (44), and an output shaft (45) secured to the rotor (44), and is a driving source for a pump device (31) provided in the flow channel (26);
- a control board (76) of the motor (40); and
- a housing (85) which houses therein the control board (76), and is connected to the substrate (80), wherein the motor (40) is a brushless motor, and is disposed in a space surrounded by the substrate (80) and the housing (85), the output shaft (45) is secured to the rotor (44) in such a way that both a first end part (45a) and a second end part (45b) of the output shaft (45) protrude from the rotor (44), the motor (40) includes
- a first bearing (46) which is configured to rotatably support the output shaft (45) at a position between the first end part (45a) and the rotor (44),
- a second bearing (47) which is configured to rotatably support the output shaft (45) at a position between the second end part (45b) and the rotor (44), and
- a motor housing (50) which houses therein the stator (41) and the rotor (44), and holds the first bearing (46) and the second bearing (47), the brake hydraulic pressure control system (70) further includes a detection mechanism (60) which is configured to detect a rotation state of the output shaft (45), a first concave part (84) which opens toward the housing (85) is formed in the substrate (80), wherein the first bearing (46) is loosely fitted into the first concave part (84) with a clearance therebetween, and wherein the motor housing (50) includes a flange (51) which protrudes outward, a second concave part (81) which is open toward the housing (85) and into which the flange (51) is inserted is formed in the substrate (80), and the motor (40) is secured to the substrate (80) in such a way that the flange (51) is pinched between a plastic deformation part (82), formed in an inner circumferential surface of the second concave part (81), and a bottom part (83) of the second concave part (81).

* * * * *